Sept. 16, 1930.  J. PACYNA ET AL  1,775,827
SLIDING DOOR HANGER
Filed July 31, 1929
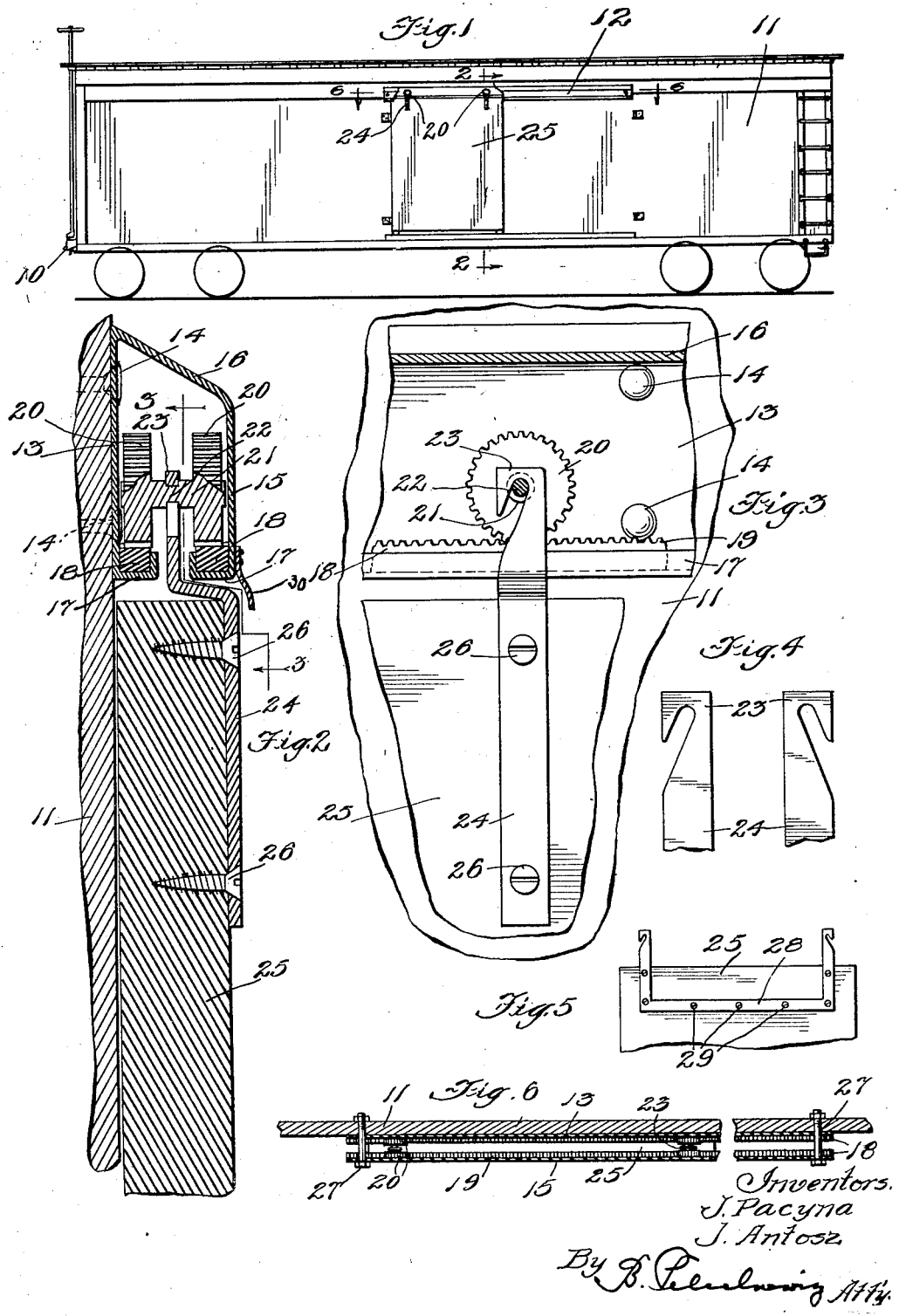

Patented Sept. 16, 1930

1,775,827

UNITED STATES PATENT OFFICE

JOSEPH PACYNA AND JOHN ANTOSZ, OF CHICAGO, ILLINOIS

SLIDING-DOOR HANGER

Application filed July 31, 1929. Serial No. 382,450.

The present invention relates to sliding doors which may have particular application to the sliding doors for use in freight cars, the principal object of the invention is the provision of sliding doors which may remain suspended upon a plurality of gear wheels which gear wheels may be adapted to travel upon rack bars.

Another object of the present invention is the provision of suitable means for supporting a pair of spaced rack bars along-side the wall of a freight car and laterally thereof for supporting a plurality of wheels upon which the door may be suspended.

Another object of the present invention is the provision of a sliding door of the character indicated which may be simple in construction and efficient in its operation.

With the above general objects in view and others that will appear as the nature of the invention is better understood the same consists in the novel construction, combination and arrangement of parts hereinafter more fully described, illustrated in the accompanying drawing and pointed out in the appended claim.

In the drawing forming a part of this application, and in which like designating characters refer to corresponding parts throughout the several views, Fig. 1 is a side elevational view of a freight car, showing the sliding door in an operative condition thereupon;

Fig. 2 is an enlarged longitudinal cross-sectional view through the door on line 2—2 of Fig. 1;

Fig. 3 is a cross-sectional view on line 3—3 of Fig. 2;

Fig. 4 is a fragmentary view of a pair of hooks by means of which the door remains suspended upon the gears;

Fig. 5 is a modified form of the hanging means aforesaid; and

Fig. 6 is a cross-sectional view on horizontal plane on line 6—6 of Fig. 1.

Referring in detail to the present drawing there is shown a freight car generally indicated by 10 having a side wall 11 with which the present invention is adapted to cooperate. Centrally of the side wall 11 of the freight car and adjacent the upper edge thereof the freight car is provided with an oblong housing generally indicated by 12, made of sheet metal or any other suitable material. Said housing 12 includes rather wider wall 13 which is adapted to rest upon side wall 11 and to which the same is attached by rivets 14. Said housing 12 further includes front narrower wall 15 and a top wall 16 which is downwardly slanting away from the freight car and which connects the upper ends of walls 13 and 15. Said slanting wall 16 is for the purpose of permitting ready flow of rain water. The lower ends of walls 13 and 15 of the housing 12 are inwardly horizontally bent and thereon the same are upwardly bent, each affecting U-shaped supports 17 for receiving therewithin and supporting a pair of rack bars 18, which, at their upper faces are provided with teeth 19.

The invention further includes two pairs of gear wheels 20, receivable within housing 12 through either open end thereof, the gears in each of the two pairs thereof are spaced and are connected by an integrally formed shaft 21, said gears being adapted to rest upon and engage the teeth of each respective rack bar 18. Each of said shafts 21 has a reduced central portion 22, which provide seats for pair of hooks 23 at the upper ends of plates 24 upon which door 25 is suspended and mounted thereupon by means of screws 26. Each of said plates 24 adjacent the upper edge of door 25 is bent toward side wall 11 of the freight car and then again the same is bent upwardly at a point centrally on a transverse line of the door so that the upper ends of said plates 24, including hooks 23, may pass through and be insertable between the inner sides of supports 17 and in order that said hooks may be directly in alinement with the central reduced portions 22 of shaft 21.

It is observed that hooks 23 are disposed in reverse directions in respect of each other, as seen on Fig. 4, for preventing their easy disengagement from shafts 21.

It is further noted that housing 12 is at least twice as long as the width of the door 25 or the opening in the side wall of the freight car which the same is intended to cover, in order to facilitate full shifting of the door off the opening for fully opening the door.

When the two pairs of gear wheels 20 have been inserted within housing 12 and the door 25 has been suspended on shaft 21 by means of hooks 23 at plates 24, bolts 27 are passed through each end of housing 12 and through side wall 11 of the freight car, for the purpose of limiting further sliding of the door in either direction.

Fig. 5 shows a modified construction of means for attaching door 25 to gears 20. This modified means includes a U-shaped plate 28 which is secured to the door by means of screws 29. The upright extensions of said U-shaped plate 28 corresponds in all respect to the construction of plates 24 including hooks 23. This modified construction will provide more permanent and durable means for suspending the door upon gears 20.

Housing 12 adjacent the lower edge of the front wall 15 has a longitudinal strip 30 which slightly flares outwardly for the purpose of permitting rain water to drop beyond door 25.

While there is described herein a preferred embodiment of the present invention it is nevertheless to be understood that minor changes may be made therein without departing from the spirit and scope of the invention as claimed.

What we claim as new is:

A door hanger for a freight car, comprising hanger members for the door, said hanger members characterized by two spaced parallel vertical arms each of said arms terminating in a hook, said hooks comprising recesses opening in opposite directions, means for slidably supporting the hooked ends of the arms, said means consisting of a plurality of pairs of gears, and spaced parallel rack supporting runways for engagement by the gears.

In testimony whereof we affix our signatures.

JOSEPH PACYNA.
JOHN ANTOSZ.